United States Patent
Yoshimura

(10) Patent No.: US 7,563,861 B2
(45) Date of Patent: Jul. 21, 2009

(54) AROMATIC RING-CONTAINING POLYMER

(75) Inventor: Ken Yoshimura, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 439 days.

(21) Appl. No.: 11/262,099

(22) Filed: Oct. 28, 2005

(65) Prior Publication Data

US 2007/0100130 A1 May 3, 2007

(51) Int. Cl.
*C08G 73/24* (2006.01)
*C08G 75/00* (2006.01)

(52) U.S. Cl. .................. 528/401; 528/106; 528/171; 528/373; 528/425

(58) Field of Classification Search .................. 528/401, 528/106, 171, 373, 425
See application file for complete search history.

(56) References Cited

U.S. PATENT DOCUMENTS

2003/0180596 A1  9/2003  Yoshimura et al.

FOREIGN PATENT DOCUMENTS

| JP | 07-268126 A | 10/1995 |
|----|-------------|---------|
| JP | 10-158456 A | 6/1998 |
| JP | 11-316515 A | 11/1999 |
| JP | 2004-002596 A | 1/2004 |

*Primary Examiner*—Duc Truong
(74) *Attorney, Agent, or Firm*—Panitch Schwarze Belisario & Nadel LLP

(57) ABSTRACT

An aromatic ring-containing polymer is provided having excellent flexibility and surface water-repellency. The polymer containing an aromatic ring has a fluoroalkyl group having two or more carbon atoms as a side chain, which is optionally interrupted by divalent group, wherein the fluoroalkyl group satisfies the following formula (a):

$$A/(A+B) \geqq 0.4 \tag{a}$$

wherein in the formula, A represents the number of fluorine atoms in the fluoroalkyl group and B represents the number of hydrogen atoms in the fluoroalkyl group.

12 Claims, No Drawings

AROMATIC RING-CONTAINING POLYMER

BACKGROUND OF THE INVENTION

The invention relates to a polymer containing an aromatic ring, more particularly a polymer containing an aromatic ring comprising a fluoroalkyl group having two or more carbon atoms as the side chains.

Compared with polymers having no aromatic rings, such as polyethylene and polypropylene, a polymer containing an aromatic ring, such as polyarylether sulfones, polyarylether ether sulfones, polyarylether ketones, polyarylether ether ketones, is high in rigidity and resistance to deformation caused by strains. On the contrary, since its primary structure is rigid, the polymer is easily cracked and broken in the case where a strain is applied. Thus, it is desired to find a polymer improved in flexibility.

Further, it has been known that the above-mentioned polymer containing an aromatic ring has a certain degree of surface water-repellency, but its surface water-repellency is not so high. As the polymer containing an aromatic ring with further improved surface water-repellency, there have been known polymers obtained by copolymerization of 4,4'-(hexafluoroisopropylidene)diphenol (or hexafluorobisphenol-A) having trifluoromethyl groups (*Progress in Polymer Science*, 26:3 (2001)).

However, the above-mentioned polymers containing an aromatic ring are insufficient in flexibility and need to improve in water resistance in the case of use under wet environments. Thus, a polymer containing an aromatic ring, but further improved in flexibility and surface water resistance, has been desired.

BRIEF SUMMARY OF THE INVENTION

The inventors of the invention have made intensive investigations to improve the above-mentioned polymer containing an aromatic ring. Consequently, the inventors have found that a polymer containing an aromatic ring comprising a fluoroalkyl group as a side chain having two or more carbon atoms, in which the number of fluorine atoms is in a specific ratio, could satisfy the purpose and have excellent properties, and have finally completed the invention on the basis of carrying out various further investigations.

That is, the invention provides a polymer containing an aromatic ring, which is of great practicality, comprises a fluoroalkyl group on the aromatic ring as a side chain, having two or more carbon atoms, and the fluoroalkyl group may optionally contain a divalent group, wherein the fluoroalkyl group satisfies the following formula (a):

$$A/(A+B) \geqq 0.4 \quad (a)$$

wherein A represents the number of fluorine atoms in the fluoroalkyl group and B represents the number of hydrogen atoms in the fluoroalkyl group.

The polymer containing an aromatic ring of the invention is of great practicality, because not only the elasticity and glass transition temperature are decreased but also the surface water-repellency is improved.

DETAILED DESCRIPTION OF THE INVENTION

Hereinafter, the invention will be described more in detail.

A polymer of the invention contains one or more aromatic rings in the repeating unit mainly composing the polymer chain. Examples of such an aromatic rings are monocyclic aromatic rings, such as benzene, polycyclic aromatic rings, such as naphthalene and biphenylene, heterocyclic aromatic rings, such as pyridine group, and polyheterocyclic aromatic rings, such as benzimidazole.

Examples of the polymer containing an aromatic ring are aromatic types of polymers containing an aromatic ring having main chains which comprise mainly aromatic rings, such as polyphenylene ethers, polynaphthylenes, polyphenylenes, polyphenylene sulfides, polyether ether ketones, polyether ether sulfones, polysulfones, polyether sulfones, polyether ketones, polybenzimidazoles, polybenzoxazoles, polybenzothiazoles, aromatic polyimides, aromatic polyamides, aromatic polyesters, aromatic polycarbonates, polypyrroles, polyquinolines, and polyquinoxalines; and aliphatic types of polymers containing an aromatic ring having main chains which comprise mainly aliphatic chains, such as polystyrenes and poly(α-methylstyrene) polymers. Further, the polymers containing an aromatic ring may be any of random copolymers, graft copolymers, alternating copolymers, and block copolymers Among these, the aromatic types of polymers containing an aromatic ring are preferable, polyphenylene ethers, polynaphthylenes, polyphenylenes, polyether sulfones, and polyether ether sulfone polymers are more preferable, and polyether sulfone polymers are most preferable.

The aromatic rings in these polymers may have substituents other than the fluoroalkyl groups to be described later, and include, for example, a hydroxyl group; alkyl groups having 1 to 6 carbon atoms, such as a methyl, ethyl, or propyl group; alkoxy groups having 1 to 6 carbon atoms, such as a methoxy group and an ethoxy group; aralkyl groups having 7 to 12 carbon atoms, such as a benzyl group; aryl groups, such as a phenyl group and a naphthyl group; and halogens, such as fluorine atom, chlorine atom, and bromine atom. A plurality of substituents may be contained and in such a case, they may be different.

Further, the polymer of the invention is a polymer containing an aromatic ring and a fluoroalkyl group having two or more carbon atoms, and preferably is a polymer containing an aromatic ring on which a fluoroalkyl group having two or more carbon atoms is substituted as side chains. The fluoroalkyl group may be interrupted by divalent groups and satisfy the following formula (a):

$$A/(A+B) \geqq 0.4 \quad (a)$$

(in the formula, A represents the number of fluorine atoms in the fluoroalkyl group and B represents the number of hydrogen atoms in the fluoroalkyl group.)

The polymer of the invention may contain a fluoroalkyl group not satisfying the above formula (a), but it is preferable that all fluoroalkyl group contained in the polymer of the present invention satisfy the above formula (a).

A/(A+B) is more preferably 0.6 or higher, further more preferably 0.8 or higher, and most preferably 1, which is the case of a perfluoroalkyl groups.

As fluoroalkyl groups of the invention can be exemplified the groups defined by the following formula (1):

In the formula, a represents a number from 2 to 20; Y represents a hydrogen atom or a fluorine atom; $Y_1$ and $Y_2$ are independently at each occurrence selected from the group consisting of hydrogen atom, fluorine atom, and trifluoromethyl group; and X independently represents at each occurrence a direct bond or divalent group.

Herein, a represents preferably from 2 to 18, more preferably from 4 to 14, and most preferably from 6 to 12. The respective units existing in the number of a may be same or different from one another.

Examples of the groups for X may include, for example, a direct bond, —O—, —S—, —CO—, —CO$_2$—, —SO$_2$—, —SO$_3$—, a phenylene group, a biphenylene group, a triphenylene group, and a naphthylene group, wherein a direct bond, —O— or —S— is preferable.

The above-mentioned fluoroalkyl groups are preferably those selected from the following formulas (A-1) to (A-16):

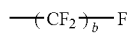  (A-1)

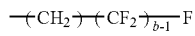  (A-2)

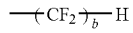  (A-3)

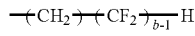  (A-4)

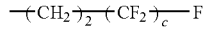  (A-5)

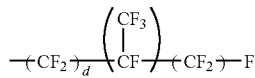  (A-6)

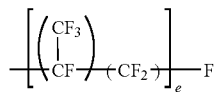  (A-7)

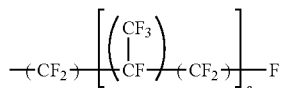  (A-8)

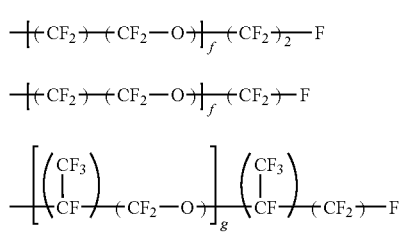  (A-9)
(A-10)
(A-11)
(A-12)

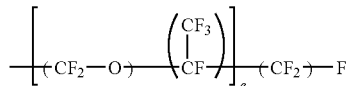  (A-13)

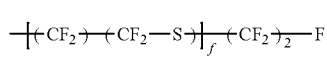  (A-14)

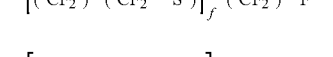  (A-15)

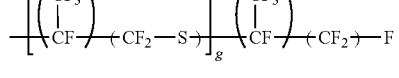

-continued

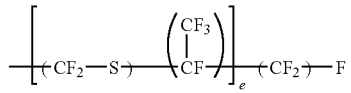  (A-16)

In the formulas, b represents a number from 2 to 20; c represents a number of 1 to 18; d represents a number of 1 to 17; e represents a number of 1 to 6; f represents a number of 1 to 9; and g represents a number of 1 to 5.

Examples of (A-1) may include —(CF$_2$)$_2$F, —(CF$_2$)$_3$F, —(CF$_2$)$_4$F, —(CF$_2$)$_5$F, —(CF$_2$)$_6$F, —(CF$_2$)$_7$F, —(CF$_2$)$_8$F, —(CF$_2$)$_9$F, —(CF$_2$)$_{10}$F, —(CF$_2$)$_{11}$F, —(CF$_2$)$_{12}$F, —(CF$_2$)$_{13}$F, —(CF$_2$)$_{14}$F, —(CF$_2$)$_{15}$F, and —(CF$_2$)$_{16}$F.

Examples of (A-2) may include —CH$_2$CF$_3$, —CH$_2$(CF$_2$)$_2$F, —CH$_2$(CF$_2$)$_3$F, —CH$_2$(CF$_2$)$_4$F, —CH$_2$(CF$_2$)$_5$F, —CH$_2$(CF$_2$)$_6$F, —CH$_2$(CF$_2$)$_7$F, —CH$_2$(CF$_2$)$_8$F, —CH$_2$(CF$_2$)$_9$F, —CH$_2$(CF$_2$)$_{10}$F, —CH$_2$(CF$_2$)$_{11}$F, —CH$_2$(CF$_2$)$_{12}$F, —CH$_2$(CF$_2$)$_{13}$F, —CH$_2$(CF$_2$)$_{14}$F, —CH$_2$(CF$_2$)$_{15}$F, and —CH$_2$(CF$_2$)$_{16}$F.

Examples of (A-3) may include —(CF$_2$)$_2$H, —(CF$_2$)$_3$H, —(CF$_2$)$_4$H, —(CF$_2$)$_5$H, —(CF$_2$)$_6$H, —(CF$_2$)$_7$H, —(CF$_2$)$_8$H, —(CF$_2$)$_9$H, —(CF$_2$)$_{10}$H, —(CF$_2$)$_{11}$H, —(CF$_2$)$_{12}$H, —(CF$_2$)$_{13}$H, —(CF$_2$)$_{14}$H, —(CF$_2$)$_{15}$H, and —(CF$_2$)$_{16}$H.

Examples of (A-4) may include —CH$_2$CF$_2$H —CH$_2$(CF$_2$)$_2$H, —CH$_2$(CF$_2$)$_3$H, —CH$_2$(CF$_2$)$_4$H, —CH$_2$(CF$_2$)$_5$H, —CH$_2$(CF$_2$)$_6$H, —CH$_2$(CF$_2$)$_7$H, —CH$_2$(CF$_2$)$_8$H, —CH$_2$(CF$_2$)$_9$H, —CH$_2$(CF$_2$)$_{10}$H, —CH$_2$(CF$_2$)$_{11}$H, —CH$_2$(CF$_2$)$_{12}$H, —CH$_2$(CF$_2$)$_{13}$H, —CH$_2$(CF$_2$)$_{14}$H, —CH$_2$(CF$_2$)$_{15}$H, and —CH$_2$(CF$_2$)$_{16}$H.

Examples of (A-5) may include —(CH$_2$)$_2$CF$_3$, —(CH$_2$)$_2$(CF$_2$)$_2$F, —(CH$_2$)$_2$(CF$_2$)$_3$F, —(CH$_2$)$_2$(CF$_2$)$_4$F, —(CH$_2$)$_2$(CF$_2$)$_5$F, —(CH$_2$)$_2$(CF$_2$)$_6$F, —(CH$_2$)$_2$(CF$_2$)$_7$F, —(CH$_2$)$_2$(CF$_2$)$_8$F, —(CH$_2$)$_2$(CF$_2$)$_9$F, —(CH$_2$)$_2$(CF$_2$)$_{10}$F, —(CH$_2$)$_2$(CF$_2$)$_{11}$F, —(CH$_2$)$_2$(CF$_2$)$_{12}$F, —(CH$_2$)$_2$(CF$_2$)$_{13}$F, —(CH$_2$)$_2$(CF$_2$)$_{14}$F, —(CH$_2$)$_2$(CF$_2$)$_{15}$F, and —(CH$_2$)$_2$(CF$_2$)$_{16}$F.

Examples of (A-6) may include —CF$_2$CF(CF$_3$)CF$_3$, —(CF$_2$)$_2$CF(CF$_3$)CF$_3$, —(CF$_2$)$_3$CF(CF$_3$)CF$_3$, —(CF$_2$)$_4$CF(CF$_3$)CF$_3$, —(CF$_2$)$_5$CF(CF$_3$)CF$_3$, —(CF$_2$)$_6$CF(CF$_3$)CF$_3$, —(CF$_2$)$_7$CF(CF$_3$)CF$_3$, —(CF$_2$)$_8$CF(CF$_3$)CF$_3$, —(CF$_2$)$_9$CF(CF$_3$)CF$_3$, —(CF$_2$)$_{10}$CF(CF$_3$)CF$_3$, —(CF$_2$)$_{11}$(CF$_3$)CF$_3$, —(CF$_2$)$_{12}$CF(CF$_3$)CF$_3$, —(CF$_2$)$_{13}$CF(CF$_3$)CF$_3$, and —(CF$_2$)$_{14}$CF(CF$_3$)CF$_3$.

Examples of (A-7) may include —CF(CF$_3$)CF$_3$, —{CF(CF$_3$)CF$_2$}$_2$F, —{CF(CF$_3$)CF$_2$}$_3$F, —{CF(CF$_3$)CF$_2$}$_4$F, —{CF(CF$_3$)CF$_2$}$_5$F, and —{CF(CF$_3$)CF$_2$}$_6$F.

Examples of (A-8) may include —CF$_2$CF(CF$_3$)CF$_3$, —CF$_2${CF(CF$_3$)CF$_2$}$_2$F, —CF$_2${CF(CF$_3$)CF$_2$}$_3$F, —CF$_2${CF(CF$_3$)CF$_2$}$_4$F, —CF$_2${CF(CF$_3$)CF$_2$}$_5$F, and —CF$_2${CF(CF$_3$)CF$_2$}$_6$F.

Examples of (A-9) may include —CF$_2$CF$_2$OCF$_2$CF$_3$, —(CF$_2$CF$_2$O)$_2$CF$_2$CF$_3$, —(CF$_2$CF$_2$O)$_3$CF$_2$CF$_3$, —(CF$_2$CF$_2$O)$_4$CF$_2$CF$_3$, —(CF$_2$CF$_2$O)$_5$CF$_2$CF$_3$, —(CF$_2$CF$_2$O)$_6$CF$_2$CF$_3$, and —(CF$_2$CF$_2$O)$_7$CF$_2$CF$_3$.

Examples of (A-10) may include —CF$_2$CF$_2$OCF$_3$, —(CF$_2$CF$_2$O)$_2$CF$_3$, —(CF$_2$CF$_2$O)$_3$CF$_3$, —(CF$_2$CF$_2$O)$_4$CF$_3$, —(CF$_2$CF$_2$O)$_5$CF$_3$, —(CF$_2$CF$_2$O)$_6$CF$_3$, and —(CF$_2$CF$_2$O)$_7$CF$_3$.

Examples of (A-11) may include —CF(CF$_3$)CF$_2$OCF(CF$_3$)CF$_3$, —{CF(CF$_3$)CF$_2$O}$_2$CF(CF$_3$)CF$_3$, —{CF(CF$_3$)CF$_2$O}$_3$CF(CF$_3$)CF$_3$, —{CF(CF$_3$)CF$_2$O}$_4$CF(CF$_3$)CF$_3$, —{CF(CF$_3$)CF$_2$O}$_5$CF(CF$_3$)CF$_3$, and —{CF(CF$_3$)CF$_2$O}$_6$CF(CF$_3$)CF$_3$.

Examples of (A-12) may include —$CF_2OCF(CF_3)CF_3$, —{$CF_2OCF(CF_3)$}$_2CF_3$, —{$CF_2OCF(CF_3)$}$_3CF_3$, —{$CF_2OCF(CF_3)$}$_4CF_3$, —{$CF_2OCF(CF_3)$}$_5CF_3$, and —{$CF_2OCF(CF_3)$}$_6CF_3$.

Examples of (A-13) may include —$CF_2CF_2SCF_2CF_3$, —$(CF_2CF_2S)_2CF_2CF_3$, —$(CF_2CF_2S)_3CF_2CF_3$, —$(CF_2CF_2S)_4CF_2CF_3$, —$(CF_2CF_2S)_5CF_2CF_3$, —$(CF_2CF_2S)_6CF_2CF_3$, and —$(CF_2CF_2S)_7CF_2CF_3$.

Examples of (A-14) may include —$CF_2CF_2SCF_3$, —$(CF_2CF_2S)_2CF_3$, —$(CF_2CF_2S)_3CF_3$, —$(CF_2CF_2S)_4CF_3$, —$(CF_2CF_2S)_5CF_3$, —$(CF_2CF_2S)_6CF_3$, and —$(CF_2CF_2S)_7CF_3$.

Examples of (A-15) may include —$CF(CF_3)CF_2SCF(CF_3)CF_3$, —{$CF(CF_3)CF_2S$}$_2CF(CF_3)CF_3$, —{$CF(CF_3)CF_2S$}$_3CF(CF_3)CF_3$, —{$CF(CF_3)CF_2S$}$_4CF(CF_3)CF_3$, and —{$CF(CF_3)CF_2S$}$_5CF(CF_3)CF_3$.

Examples of (A-16) may include —$CF_2SCF(CF_3)CF_3$, —{$CF_2SCF(CF_3)$}$_2CF_3$, —{$CF_2SCF(CF_3)$}$_3CF_3$, —{$CF_2SCF(CF_3)$}$_4CF_3$, —{$CF_2SCF(CF_3)$}$_5CF_3$, and —{$CF_2SCF(CF_3)$}$_6CF_3$.

Among these examples, groups of (A-1) to (A-4) are preferable, and groups of (A-1) are more preferable.

The fluoroalkyl group in the invention has, as described above, 2 to 20 carbon atoms and preferably 4 or more and further preferably 6 or more.

The fluoroalkyl group in the invention exists, as described above, as the side chain of the polymer containing an aromatic ring and may be bonded directly to the aromatic ring or through divalent groups. Examples of the divalent groups are —O—, —S—, —CO—, —$CO_2$—, —$SO_2$—, and —$SO_3$—. Examples are direct bond, O—, and —S—.

The fluoroalkyl group is generally present in a number of 0.1 to 4 per one aromatic ring in the polymer containing an aromatic ring. It is preferably present in a number of 0.2 to 3.5 and more preferably 0.3 to 3 per one aromatic ring.

The polymer containing an aromatic ring of the invention comprises the fluoroalkyl group specified as described above, as a side chain and has a number average molecular weight of generally about 1,000 to 1,000,000, preferably about 3,000 to 500,000, and more preferably about 5,000 to 100,000.

Next, a production method of the polymer containing an aromatic ring of the invention will be described.

The polymer of the invention can be obtained by a reaction of a polymer containing an aromatic ring having functional group(s) and a fluoroalkyl having a functional group in the presence of a proper reagent.

More practically, (1) in the case of reaction of a polymer containing an aromatic ring having halogen(s) and a fluoroalkyl having halogen(s), a polymer containing an aromatic ring, and the fluoroalkyl group directly bonded with the aromatic ring can be obtained by reaction in the presence of a metal. A preferable halogen is bromine and iodine. A method of obtaining the polymer containing an aromatic ring having halogen includes a method of introducing bromine by reacting N-bromosuccinimide on an aromatic ring of the polymer, and conventionally known methods of introducing halogen by directly reacting chlorine gas, bromine, iodine and the like on an aromatic ring of the polymer. In the case of reaction of the polymer containing an aromatic ring having halogen(s) and the fluoroalkyl having halogen(s), although it is usually possible to carry out the reaction without using a solvent, it is preferable to carry out in a solvent. Examples of the solvent to be used include hydrocarbon solvents, ether solvents, ketone solvents, amide solvents, sulfone solvents, and sulfoxide solvents. Among these, tetrahydrofuran, diethyl ether, dimethyl sulfoxide, sulfolane, N,N-dimethylformamide, N,N-dimethylacetamide, N-methylpyrrolidone, and N,N'-dimethyl imidazolidinone are preferably used. Examples of the metal are copper, sodium, lithium, potassium, zinc, iron, chromium, nickel, and magnesium and preferables are copper, zinc, and sodium. The amount of the metal to be used is ½ equivalent or higher to the total amount of the haloalkyl and/or the haloaryl. The reaction temperature is preferably from –10° C. to 250° C. and more preferably from 0° C. to 200° C.

(2) A polymer containing aromatic ring into which fluoroalkyl group(s) is(are) introduced via —O— bond can be synthesized by a reaction of a polymer containing an aromatic ring having halogen(s) and a fluoroalkyl containing hydroxyl group(s) or reaction of a polymer containing an aromatic ring having hydroxyl group(s) and a fluoroalkyl containing halogen(s) in the presence of a base. The reaction is known as the Williamson synthesis (J. McMurry, *Organic Chemistry II*, 1st edition, p. 636, Tokyo Kagaku Dozin Co., Ltd. (1987)). The reaction can generally be carried out in the absence of a solvent. However, it is preferable to carry out the reaction in a solvent. Examples to be used as the solvent are aromatic hydrocarbon solvents, ether solvents, ketone solvents, amide solvents, sulfone solvents, and sulfoxide solvents. Preferable examples to be used are tetrahydrofuran, diethyl ether, dimethyl sulfoxide, sulfolane, N,N-dimethylformamide, N,N-dimethylacetamide, N-methylpyrrolidone, and N,N'-dimethyl imidazolidinone. The base is not particularly limited and examples of it are sodium hydroxide, potassium hydroxide, potassium carbonate, metal sodium, metal potassium, metal lithium, sodium hydride, potassium hydride, lithium hydride, triethylamine, and pyridine. The reaction temperature is preferably from –10° C. to 250° C. and more preferably from 0° C. to 200° C.

(3) A polymer containing an aromatic ring into which fluoroalkyl group(s) is(are) introduced via —S— bond can be synthesized by a reaction of a polymer containing an aromatic ring having —SH group(s) and a fluoroalkyl containing halogen(s), or a reaction of a polymer containing an aromatic ring having halogen(s) and a fluoroalkyl having —SH group(s) in the presence of a base. Examples of halogens are fluorine, chlorine, bromine, and iodine. The reaction can generally be carried out in the absence of a solvent. However, it is preferable to carry out the reaction in a solvent. The reaction conditions, such as the solvent, the base, and the reaction temperature, are similar to those shown in the above description (2).

(4) A polymer containing an aromatic ring into which fluoroalkyl group(s) is(are) introduced via —CO— bond can be synthesized by a reaction of a polymer containing an aromatic ring and a fluoroalkyl having a carboxylic acid halide. The reaction is known as the Friedel-Crafts reaction (J. McMurry, *Organic Chemistry II,* 1st edition, p. 557, Tokyo Kagaku Dozin Co., Ltd. (1987)). Examples of the carboxylic acid halide are carboxylic acid chloride, carboxylic acid bromide, and carboxylic acid fluoride. The reaction can be generally carried out at a high yield when it is conducted in the presence of a Lewis acid catalyst. Examples of the Lewis acid are aluminum chloride, antimony chloride, iron chloride, titanium chloride, bismuth chloride, and zinc chloride, and aluminum chloride is used preferably. The reaction can generally be carried out in melt state without using a solvent; however it may be carried out using a solvent. Examples to be used as the solvent are aliphatic hydrocarbon solvents, such as hexane and heptane; carbon disulfide, tetrachloromethane, nitrobenzene, dichlorobenzene, and nitromethane. The reaction temperature is preferably from –10° C. to 250° C. and more preferably from 0° C. to 200° C.

(5) A polymer containing an aromatic ring into which fluoroalkyl group(s) is(are) introduced via —$SO_2$— bond can be synthesized by a reaction of a polymer containing an aromatic ring and a fluoroalkyl having a sulfonic acid halide. Examples of the sulfonyl halide group are chlorosulfonyl groups and fluorosulfonyl groups. The reaction can be generally carried out at a high yield when it is conducted in the presence of a Lewis acid catalyst. Examples of the Lewis acid are aluminum chloride, antimony chloride, iron chloride, titanium chloride, bismuth chloride, and zinc chloride, and aluminum chloride is used preferably. The reaction can generally be carried out in melt state without using a solvent; however it may be carried out using a solvent. The reaction conditions of the solvent, the reaction temperature, and the like may be similar to those described in the description (4).

(6) A polymer containing an aromatic ring polymer into which fluoroalkyl group(s) is(are) introduced via —$CO_2$— bond can be synthesized by a reaction of a polymer containing an aromatic ring having hydroxyl group(s) and a fluoroalkyl having a carboxylic acid halide, or reaction of a polymer containing an aromatic ring having carboxylic acid halide(s) and a fluoroalkyl containing hydroxyl group. Examples of the carboxylic acid halide are carboxylic acid chloride, carboxylic acid bromide, and carboxylic acid fluoride. The reaction can be generally carried out at a high yield when it is conducted in the presence of a base. Preferable examples of the base to be used are aromatic amines, such as pyridine and quinoline; and aliphatic amines, such as triethylamine and tetramethylethylenediamine. The reaction can generally be carried out in melt state without using a solvent; however it may be carried out using a solvent. Examples to be used as the solvent are aromatic hydrocarbon solvents, ether solvents, ketone solvents, amide solvents, sulfone solvents, and sulfoxide solvents, and examples to be used preferably are tetrahydrofuran, diethyl ether, dimethyl sulfoxide, sulfolane, N,N-dimethylformamide, N,N-dimethylacetamide, N-methylpyrrolidone, and N,N'-dimethyl imidazolidinone. The reaction temperature is preferably from $-10°$ C. to $250°$ C. and more preferably from $0°$ C. to $200°$ C.

(7) A polymer containing an aromatic ring into which fluoroalkyl group(s) is(are) introduced via —$SO_3$— bond can be synthesized by a reaction of a polymer containing an aromatic ring having hydroxyl group(s) and a fluoroalkyl having a sulfonic acid halide, or reaction of a polymer containing an aromatic ring having sulfonic acid halide(s) and a fluoroalkyl containing hydroxyl group. Examples of the sulfonic acid halide(s) are sulfonic acid chloride, sulfonic acid bromide, and sulfonic acid fluoride. The reaction can be carried out at a high yield, for example, when it is conducted in the presence of a base. Examples of the base are the similar bases described in the description (6). Aromatic amines, such as pyridine and quinoline, and aliphatic amines, such as triethylamine and tetramethylethylenediamine, can preferably be used. The reaction can generally be carried out in melt state without using a solvent; however it may be carried out using a solvent. Examples to be used as the solvent are similar solvents exemplified in the description (6). Also, with respect to the reaction temperature, it is similar to that described in the description (6).

Further, (8) a desired polymer of the invention can be synthesized by a polymerization reaction using a monomer containing fluoroalkyl. Hereinafter, a method of obtaining polyether sulfones as a representative example will be described.

The method of obtaining polyether sulfones includes a method of reaction of a dihalodiphenyl sulfone and a diol in the presence of an alkali. Herein, one or more kinds of monomers having fluoroalkyl group(s) as described above are used as the monomer, so that the polyether sulfones having fluoroalkyl group(s) as the side chain can be obtained.

Examples of the dihalodiphenyl sulfone are 4,4'-difluorodiphenylsulfone, 4,4'-dichlorodiphenylsulfone, 4,4'-dibromodiphenylsulfone, 2,2'-difluorodiphenylsulfone, 2,2'-dichlorodiphenylsulfone, 2,2'-dibromodiphenylsulfone, 2,4'-difluorodiphenylsulfone, 2,4'-dichlorodiphenylsulfone, 2,4'-dibromodiphenylsulfone, and these sulfones into which fluoroalkyl group(s) is(are) introduced. These monomers may have substituent group(s) other than the fluoroalkyl group(s), and some or all of the hydrogen atoms of these monomers may be substituted with fluorine atoms. Two or more kinds of these monomers may be used in the form of mixtures.

Examples of the diol are hydroquinone, 2-methoxyhydroquinone, 2-chlorohydroquinone, resorcinol, catechol, 1,2-dihydroxynaphthalene, 1,4-dihydroxynaphthalene, 1,5-dihydroxynaphthalene, 2,6-dihydroxynaphthalene, 2,7-dihydroxynaphthalene, 4,4'-dihydroxybiphenyl, 2,4'-dihydroxybiphenyl, 2,2'-dihydroxybiphenyl, 4,4'-dihydroxydiphenylmethane, 1,1-bis(4-hydroxyphenyl) ethane, 1,1-bis(4-hydroxyphenyl)cyclohexane, 2,2-bis(4-hydroxyphenyl)propane, 2,2-bis(4-hydroxyphenyl)butane, 2,2-bis(4-hdyroxyphenyl)-1,1,1,3,3,3-hexafuoropropane, 1,1-bis(4-hydroxyphenyl)-1-phenylethane, bis(4-hydroxyphenyl)diphenylmethane, 9,9-bis(4-hydroxyphenyl)fluorene, $\alpha,\alpha'$-bis(4-hydroxyphenyl)-1,4-diisopropylbenzene, 4,4'-dihydroxydiphenyl ether, 2,2'-dihydroxydiphenyl ether, bis(4-hydroxyphenyl)sulfide, bis(2-hydroxyphenyl)sulfide, 1,2-bis(4-hydroxyphenyl)ethane, 1,2-bis(4-hydroxyphenoxy)ethane, 1,2-bis(3-hydroxyphenoxy)ethane, 1,2-bis(4-hydroxyphenoxy)propane, 1,3-bis(4-hydroxyphenoxy)propane, 1,4-bis(4-hydroxyphenoxy)butane, 1,6-bis(4-hydroxyphenoxy)hexane, diethylene glycol bis(4-hydroxyphenyl)ether, and those obtained by introducing fluoroalkyl groups into these diols. These monomers may have substituent group(s) other than the fluoroalkyl group, some or all of the hydrogen atoms of these monomers may be replaced with fluorine atoms, and mixtures of two or more kinds of these monomers may be used.

Examples of the alkalis are sodium hydroxide, potassium hydroxide, potassium carbonate, metal sodium, metal potassium, metal lithium, sodium hydride, potassium hydride, lithium hydride, triethylamine, and pyridine.

The reaction can generally be carried out in melt state without using a solvent; however it is preferable to carry out the reaction in a proper solvent. Examples to be used as the solvent are aromatic hydrocarbon solvents, ether solvents, ketone solvents, amide solvents, sulfone solvents, and sulfoxide solvents, and examples to be preferably used are dimethyl sulfoxide, sulfolane, N,N-dimethylformamide, N,N-dimethylacetamide, N-methylpyrrolidone, and N,N'-dimethyl imidazolidinone because of high solubility.

The reaction temperature is generally from $20°$ C. to $250°$ C. and preferably from $50°$ C. to $200°$ C.

Methods of producing copolymers include, a method of polymerizing two or more kinds of monomers in combination, and a method of polymerizing one kind of monomer and then adding a second type monomer or polymer to the produced polymer. Block copolymers, random copolymers, alternating copolymers, multi-block copolymers, graft copolymers and the like can be produced by using these methods or combinations.

The polymer of the invention can be obtained in such a manner. The obtained polymer can be molded to be a film or fiber by a solvent cast method from a solution or suspension, or can be molded to be a sheet, film, fiber, or a three-dimensional molded product by melting and cooling.

The solvent cast method is practically a method carried out by dissolving the polymer in a proper solvent, applying the solution on a glass plate, and removing the solvent. The solvent to be used for the film formation is not particularly limited as long as it can dissolve the polymer therein and be removed thereafter. Examples to be used preferably as the solvent are non-protonic polar solvents, such as N,N-dimethylformamide, N,N-dimethylacetamide, N-methyl-2-pyrrolidone, and dimethyl sulfoxide; chlorine type solvents, such as dichloromethane, chloroform, 1,2-dichloroethane, chlorobenzene, and dichlorobenzene; alcohols, such as methanol, ethanol, and propanol; and alkylene glycol monoalkyl ethers, such as ethylene glycol monomethyl ether, ethylene glycol monoethyl ether, propylene glycol monomethyl ether, and propylene glycol monoethyl ether. They may be used alone or if necessary, two or more kinds of solvents may be mixed and used. Among these, dimethyl sulfoxide, N,N-dimethylformamide, N,N-dimethylacetamide, and N-methyl-2-pyrrolidone are preferably used, and hot N-methylpyrrolidone is more preferable because of high solubility. Herein, hot N-methylpyrrolidone means N-methylpyrrolidone at 50° C. or higher and 200° C. or lower.

To improve the various kinds of physical properties of the film, plasticizers, stabilizers, and release agents to be used commonly for a polymer may be added to the polymer of the invention. Also, another polymer may be compounded and alloyed with the polymer of the invention by mixing the polymers in a single solvent and casting together.

Further, to improve the mechanical strength of the film, a cross-linking method by radiating electron beam, radioactive beam and the like has been known.

EXAMPLES

The invention will be described with reference to examples. However, it is not intended that the invention be limited to the illustrated examples. Properties were determined by the following methods:

Elasticity: According to JIS K 7127, measurement was carried out by a tensile test at testing speed of 10 mm/min at 23° C. and 50% relative humidity.

Glass transition temperature: Using a differential thermal analyzer (DSC 200, manufactured by Seiko Instruments Inc.), measurement was carried out at 5° C./min heating speed.

Contact angle measurement: Using a contact angle measurement apparatus (CA-A model, manufactured by Kyowa Interface Science Co., Ltd.), the contact angle of the polymer to water was measured.

Reference Example 1

Bromination reaction of poly(oxy-1,4-phenylene-sulfone-1,4-phenylene-oxy-1,4-phenylene-1,4-phenylene)

In a flask, 15 g of poly(oxy-1,4-phenylene-sulfone-1,4-phenylene-oxy-1,4-phenylene-1,4-phenylene) (manufactured by Aldrich) and 80 ml of methylene chloride were placed and dissolved. While the flask was kept at 0° C., 47 g (292 mmol) of bromine was added, and reaction was carried out at a room temperature for 4 hours. After that, the reaction solution was added to an excess amount of an aqueous $Na_2SO_3$ solution to precipitate a polymer, which was washed with water and methanol to obtain 20.5 g of a polymer.

According to elementary analysis, $^1$H-NMR, and $^{13}$C-NMR measurement, the obtained polymer (a) was found to have phenyl rings into which bromine atoms were introduced. The bromo groups were introduced at a ratio of 27% by weight into the obtained polymer (a). According to molecular weight measurement by GPC using N,N-dimethylacetamide (hereinafter, abbreviated as DMAc) as a developer solvent, the number average molecular weight was 34,000 based on a polystyrene calibration standard.

Example 1

Reaction of the Polymer (a) and Perfluorohexyl Iodide 4 g of the polymer (a) produced in Reference Example 1, 4 g (63 mmol) of copper powder, and 50 ml of dimethyl sulfoxide were added to a flask flushed with nitrogen and mixed at 120° C. for 2 hours. Then, the mixture was kept at 120° C., and 4 g (8.97 mmol) of perfluorohexyl iodide manufactured by Aldrich was added. After reaction was carried out at 120° C. for 6 hours, the reaction solution was poured into an aqueous 5N—HCl solution 100 ml to precipitate a polymer. After separation by filtration, the polymer was dissolved again in N-methylpyrrolidone (hereinafter, abbreviated as NMP) to separate insoluble materials by filtration, and then the polymer was poured into 100 ml of an aqueous 5N—HCl solution to precipitate and purify the polymer. The polymer was separated by filtration and dried and again dissolved in hot NMP, and the solution was spread on a laboratory dish and cast at 80° C. to obtain a 35 µm-thick tough film (b). As a result of elementary analysis of the film (b), the film (b) was found to contain 26.6 wt. % of fluorine atoms. $^1$H-NMR and $^{19}$F-NMR measurement and elementary analysis were carried out to find that the fluoroalkyl side chains of the polymer (b) were on an aromatic ring and that 0.4 perfluoroalkyl groups having 6 carbon atoms were introduced per one aromatic ring. The polymer (b) was found to have A/(A+B) equal 1. The elasticity and the glass transition temperature of the polymer (b) are shown in Table 1. The contact angle of the polymer (b) to water was measured and the result is shown in Table 2.

Example 2

A 40 µm-thick tough film (c) was obtained in the same manner as Example 1, except that 6 g (13.5 mmol) of perfluorohexyl iodide was used. As the result of the elementary analysis of the film (c), the film (c) was found to contain 41.2 wt. % of fluorine atoms. $^1$H-NMR and $^{19}$F-NMR measurement and elementary analysis were carried out to find that the fluoroalkyl side chains of the polymer (c) were on an aromatic ring and that 0.8 perfluoroalkyl groups having 6 carbon atoms were introduced per one aromatic ring. The polymer (c) was found to have A/(A+B) equal 1. The elasticity and the glass transition temperature are shown in Table 1. The contact angle of the polymer (c) to water was measured and the result is shown in Table 2.

Comparative Example 1

Poly(oxy-1,4-phenylene-sulfone-1,4-phenylene-oxy-1,4-phenylene-1,4-phenylene) manufactured by Aldrich was dissolved in NMP, and the obtained solution was spread on a laboratory dish and cast at 80° C. to obtain a 50 µm-thick film (d). The elasticity and the glass transition temperature are shown in Table 1. The contact angle of the polymer (d) to water was measured, and the result is shown in Table 2.

TABLE 1

| | Elasticity MPa | Glass transition temperature °C. |
|---|---|---|
| Example 1 | 766 | 167 |
| Example 2 | 671 | 153 |
| Comparative Example 1 | 1060 | 216 |

Comparative Example 2

Poly(oxy-1,4-phenylenehexafluoroisopropylidene-1,4-phenylene-oxy-4,4'-octafluorophenylene)

In a flask flushed with nitrogen, 60 ml of DMAc, 6.73 g (20 mmol) of 4,4'-(hexafluoroisopropylidene)diphenol, 2.90 g (21 mmol) of potassium carbonate, and 10 ml of toluene were poured, and after azeotropic delydration, toluene was removed by distillation. The resulting reaction system was cooled to a room temperature, and 6.72 g (20.1 mmol) of decafluorobiphenyl was added, and reaction was carried out at 80° C. for 20 hours. On completion of the reaction, diluted hydrochloric acid was poured in to precipitate a polymer, which was washed with methanol and vacuum dried to obtain 12.6 g of the polymer. The polymer was dissolved in DMAc, and the obtained solution was spread on a laboratory dish and cast at 80° C. to obtain a film (e). The film (e) was found to have A/(A+B) equal 1. The contact angle of the film (e) to water was measured and the result is shown in Table 2.

TABLE 2

| | Contact angle measurement |
|---|---|
| Example 1 | 99° |
| Example 2 | 112° |
| Comparative Example 1 | 85° |
| Comparative Example 2 | 93° |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A polymer containing an aromatic ring comprising a fluoroalkyl group having two or more carbon atoms as a side chain, the fluoroalkyl group being optionally interrupted by a divalent group, wherein the fluoroalkyl group is bonded directly to the aromatic ring or through a divalent group selected from the group consisting of —O—, —S—, —CO—, CO$_2$—, SO$_2$, —SO$_3$—, and the fluoroalkyl group satisfies the following formula (a):

$$A/(A+B) \geq 0.4 \quad (a)$$

wherein A represents the number of fluorine atoms in the fluoroalkyl group and B represents the number of hydrogen atoms in the fluoroalkyl group.

2. The polymer containing an aromatic ring according to claim 1, wherein the polymer has an aromatic main chain comprising mainly an aromatic ring.

3. The polymer containing an aromatic ring according to claim 1, wherein the fluoroalkyl group is defined by the formula (1):

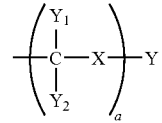

(1)

wherein a represents a number of from 2 to 20; Y represents a hydrogen atom or a fluorine atom; Y$_1$ and Y$_2$ are independently at each occurrence selected from the group consisting of hydrogen atom, fluorine atom, and trifluoromethyl group, and X independently represents at each occurrence a direct bond or a divalent group.

4. The polymer containing an aromatic ring according to claim 3, wherein X is selected from the group consisting of a direct bond, —O—, —S—, —CO—, —CO$_2$—, —SO$_2$—, —SO$_3$—, a phenylene group, a biphenylene group, a triphenylene group, and a naphthylene group.

5. The polymer containing an aromatic ring according to claim 1, wherein the number of carbon atoms of the fluoroalkyl group is from 2 to 20.

6. The polymer containing an aromatic ring according to claim 5, wherein the fluoroalkyl group is selected from the following formulas (A-1) to (A-16):

(A-1)

(A-2)

(A-3)

(A-4)

(A-5)

(A-6)

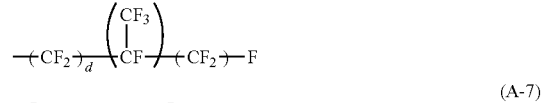
(A-7)

(A-8)

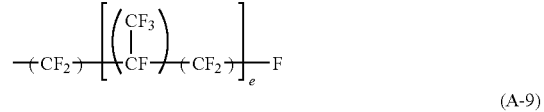
(A-9)

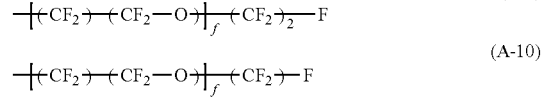
(A-10)

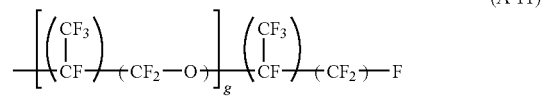
(A-11)

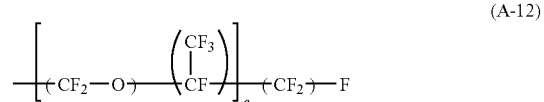
(A-12)

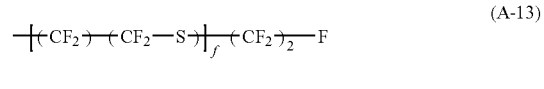
(A-13)

-continued

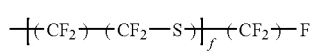 (A-14)

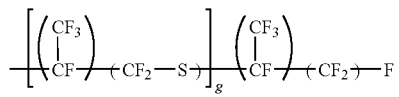 (A-15)

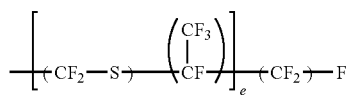 (A-16)

wherein b represents a number of from 2 to 20; c represents a number of from 1 to 18; d represents a number of from 1 to 17; e represents a number of from 1 to 6; f represents a number of from 1 to 9; and g represents a number of from 1 to 5.

7. The polymer containing an aromatic ring according to claim 1, wherein the number of fluoroalkyl groups is from 0.1 to 4 per one aromatic ring of the polymer.

8. The polymer containing an aromatic ring according to claim 1, wherein a number average molecular weight of the polymer is from 1,000 to 1,000,000.

9. The polymer containing an aromatic ring according to claim 1, wherein the fluoroalkyl group having two or more carbon atoms is on the aromatic ring as a side chains.

10. A solution containing the polymer containing an aromatic ring according to claim 1.

11. A suspension containing the polymer containing an aromatic ring according to claim 1.

12. A molded article comprising the polymer containing an aromatic ring according to claim 1.

* * * * *